INVENTORS
ROBERT F. MILLER
JOHAN LUND
BY
THEIR ATTORNEY

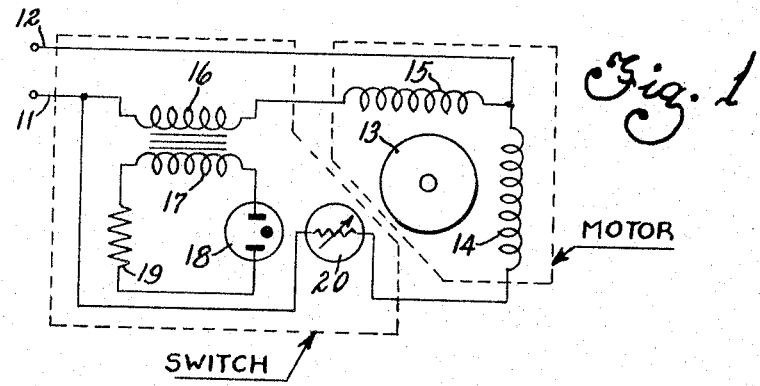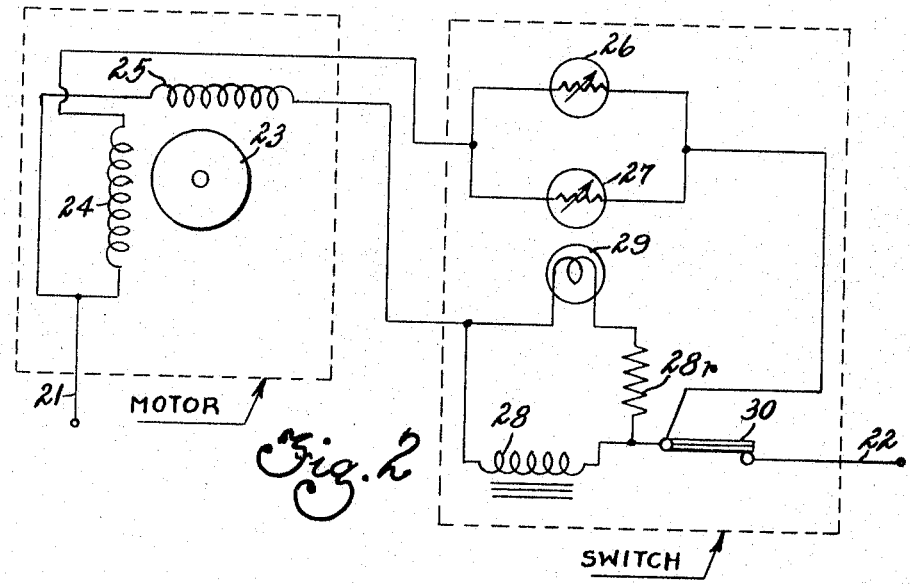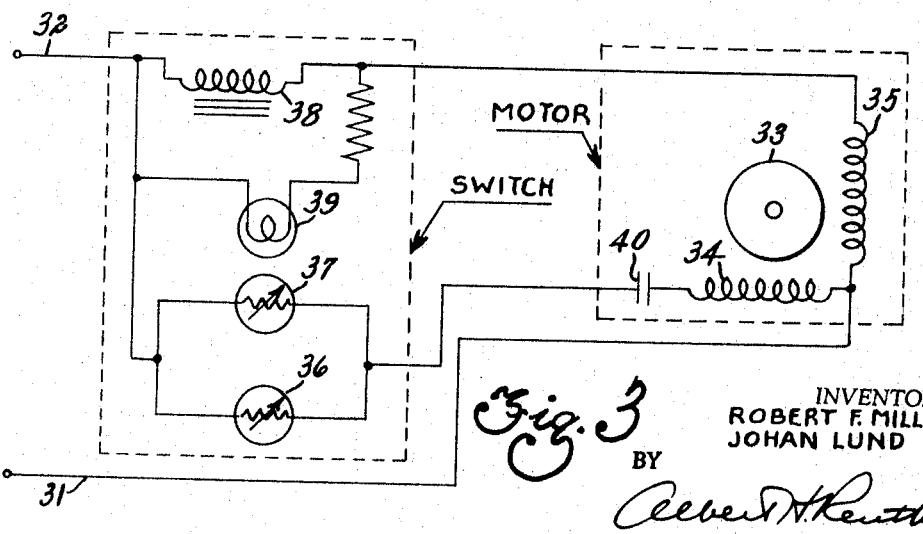

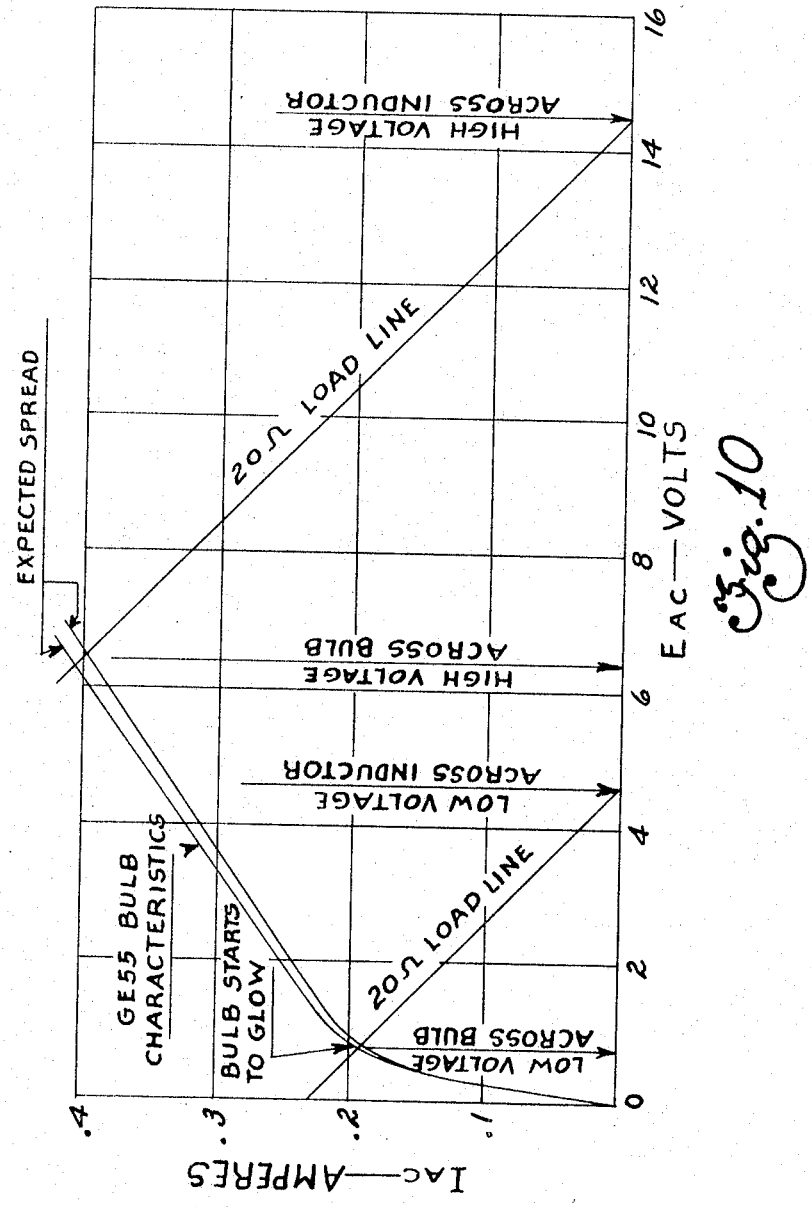

United States Patent Office 3,320,505
Patented May 16, 1967

3,320,505
INDUCTION MOTOR OPTO-ELECTRONIC STARTING CIRCUIT
Robert F. Miller and Johan Lund, Kokomo, Ind., assignors to General Motors Corporation, Detroit, Mich., a corporation of Delaware
Filed Feb. 26, 1965, Ser. No. 435,663
14 Claims. (Cl. 318—221)

This invention relates to utilization of solid state devices, and, more particularly, to circuitry for opto-electronic control of machine operation for conditions of starting and running.

Problems of contact wear and communications interference are encountered during transition from starting to running operation of a motor means for example. Attempts have been made to overcome such problems. Accordingly an object of the present invention is to provide new and improved opto-electronic control arrangement for machine starting and running operations with increased reliability because of removal of wearing contact means accompanied by smooth and quiet transition from start to run and vice versa with a combination of components utilizing solid state devices which are light sensitive.

Another object of this invention is to provide dynamoelectric machine means having winding portions thereof usable for starting and running purposes subject to light energization in response to magnitude of starting and/or running current conditions whereby solid state photosensitive switching establishes machine winding portions utilization.

Another object of this invention is to provide opto-electronic motor starting with a light-triggered solid state switching and with impedance means adapted to function regardless of variously sized motor means.

A further object of this invention is to provide opto-electronic switching components in combination to establish motor starting and running connection of winding portions having motor speed and/or current sensing means for light energization in accordance therewith adjacent to parallel photoconductive cells of which resistance changes non-linearly effectively to "make and break" starting connections.

Another object of this invention is to provide on hermetically sealed motor means such as refrigeration equipment a motor starting control with opto-electronic switching components including at least one light actuated silicon control rectifier means and an impedance means magnetically responsive to motor operating conditions whereby problems of contact wear and communications interference are overcome with successful operation under various circumstances.

Further objects and advantages will be apparent from the following description, reference being had to the accompanying drawings wherein preferred embodiments of the present invention are clearly shown.

In the drawings:

FIGURE 1 shows motor starting circuitry having features in accordance with the present invention.

FIGURE 2 shows motor starting circuitry for further starting arrangement for motor means including overload protection.

FIGURE 3 illustrates application of features of the present invention to another motor means.

FIGURE 10 is a graphical showing of component characteristics as an example of operation in accordance with the present invention.

Figure 4:
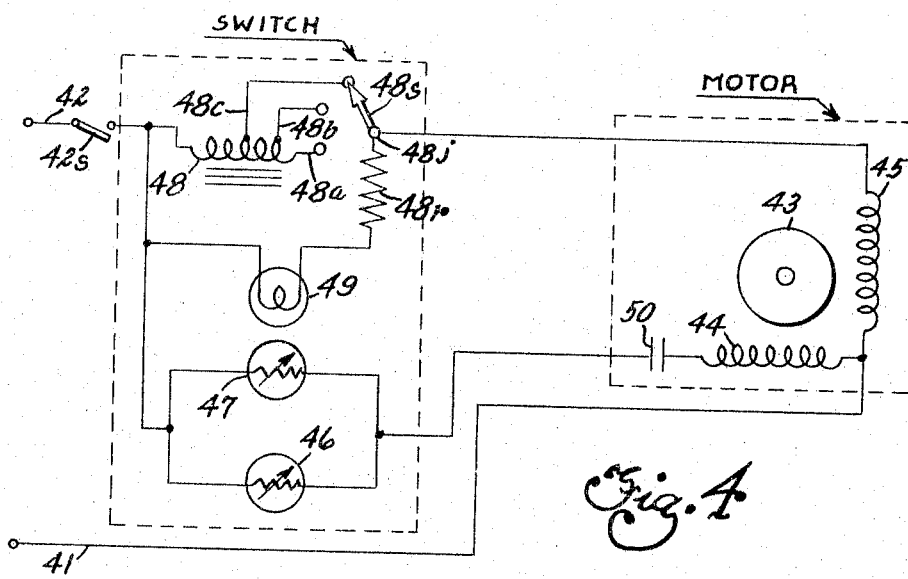
FIGURE 4 illustrates circuitry with tapped impedance means and motor starting components having features in accordance with the present invention.

In FIGURE 1 there is shown circuitry including first and second power supply lines 11 and 12 for energization of a motor means having a squirrel cage rotor 13 as well as a starting or phase winding portion 14 and running or main winding portion 15. A transformer means including a primary portion 16 in series from the supply line 11 to the running winding 15 is magnetically coupled with a secondary transformer portion 17 for energization of a neon bulb or gas bulb light means 18. A suitable limiting resistance means 19 can be provided in series between the transformer secondary portion 17 and bulb means 18. The bulb means 18 having the gaseous filling is caused to fire or become illuminated because in response to relatively large or high currents in the running winding portion 15 and primary transformer portion 16 during starting, the current transformer secondary portion provides signals of sufficient strength for voltage and current values to fire the bulb means. Firing or illumination of the bulb means 18 occurs in proximity to or adjacent to a light-controlled silicon controlled rectifier means or cadmium sulfide cell that is a light dependent resistor means 20 in FIGURE 1. It is to be understood that the motor means including the rotor 13, starting winding portion 14 and running winding portions 15 can be installed on a hermetically sealed refrigeration compressor means such as on an air conditioning or refrigerator means. Use of the light controlled silicon controlled rectifier means or light dependent resistor means 20 permits elimination of movable contacts and insures reliability as well as long life. FIGURE 1 illustrates use of such light sensitive means 20 together with a current detection in the main or running winding portion of the motor. At high starting currents the current transformer puts out enough voltage for firing the bulb means 18 which turns on the starting winding due to sensing of the light from the bulb means 18 in the light sensitive means 20. As running speed is reached, the current magnitude in the running winding portion decreases such that minimum potential for sustaining bulb firing is passed. It is to be noted that hysteresis characteristics of the gas bulb or tube means 18 are ideally utilized for causing the starting winding to cut in below the cutout point in terms of motor speed yet requiring no movable contacts or centrifugal switch devices.

During functioning of the circuitry of FIGURE 1, the transformer with its primary winding portion 16 inserted in series with the main motor winding portion 15 provides a secondary voltage due to turn-on motor wattage whereby inrush current is sufficient to light the bulb means 18. The light of the bulb means 18 then lowers the resistance of the light dependent resistor means, cadmium sulfide cell or light controlled silicon controlled rectifier means so that the phase or starting winding 14 is energized.

FIGURE 2 shows motor starting circuitry for further starting arrangement for motor operation from a suitable source of energy connected to a supply line 21 and a supply line 22. The motor means includes a rotor portion 23 as well as a phase or starting winding portion 24 and a main or running winding portion 25 suitably enclosed in a housing or hermetic unit as represented by dotted lines in FIGURE 2. A pair of light dependent resistor means or cadmium sulfide cells 26 and 27 are in parallel with each other though collectively in series with the starting winding 24 of the motor means. In circuitry of FIGURE 2, an iron-core inductor means 28 is connected in series with the main or running winding 25 of the motor for sensing the inrush current at turnon. The voltage induced across the inductor means 28 is applied to a series combination of a resistor 28r and an incandescent lamp bulb means 29. The bulb means 29 receives rated voltage during this initial condition. The light from the bulb means falls on two cadmium sulfide photo-conductive cells identified previously by reference numerals 26 and 27 so as to lower their parallel resistance sufficiently to allow the starting winding portion 24 to draw current.

The motor means starts when the light from the bulb means 29 lowers parallel resistance of the cadmium sulfide photoconductive cells 26 and 27. As the speed of the motor means increases, the current through the main winding portion 25 decreases to its normal operating value with a consequent drop in the inductor voltage. The bulb and resistance combination are sufficiently non-linear that the bulb extinguishes, for all practical purposes, and the photoconductive cells 26 and 27 assume a dark resistance value sufficient to open-circuit the starting winding portion 24. A suitable thermal protective means or relay 30 can be provided in series with the supply line 22 and the other components energizable together with the main winding portion 25 as shown in FIGURE 2. Some of the advantages of this circuitry are increased reliability because of removal of contacts, a smooth and quiet transition from starting to running operation since the starting current is inversely proportional to speed, and the use of a resistive switch that virtually eliminates radio interference during switching operation.

Circuitry of FIGURE 3 is similar to that of FIGURE 2 with power being supplied by way of lines 31 and 32 for energization of a motor means having a rotor 33 as well as a phase or starting winding 34 and main or running winding 35. An iron-core inductor means, resistance means and lamp bulb means as well as cadmium sulfide photoconductive cells are represented by refeernce numerals ten digits higher than those for the circuitry of FIGURE 2. Thus the photoconductive cells 36 and 37 are provided in the circuitry of FIGURE 3 and are connected in series with the starting winding also having a capacitance or phase shifting means 40 in series therewith. The motor means and switch means collectively including certain of the components identified by reference numerals with the digits ten numerals higher than in FIGURE 2 are indicated and adapted for use particularly with $7/32$ horsepower motor means on refrigerators of a type made by the assignee of the present invention. It is to be noted that the iron-core inductor means 28 and 38 can be modified to have at least one or more tap connections thereto as represented in the circuitry illustrated by FIGURE 4 of the drawings.

In FIGURE 4 of the drawings the circuitry is energized by supply lines 41 and 42 subject to inclusion of a switch means 42s. The motor means includes a suitably journalled rotor 43 as well as a starting winding portion 44 and running winding portion 45. The cadmium sulfide photoconductive cell means 46 and 47 are connected in series with a capacitance means 50 as to the starting winding portion 44 in a manner similar to that noted for circuitry of FIGURE 3. The ironcore inductor means 48 in the circuitry of FIGURE 4 has an end connection 48a as well as tap connections 48b and 48c selectively engageable by a movable switch arm 48s connected to a juncture 48j to which a resistance means 48r is connected in series from the energizable neon or lamp bulb means 49. In the circuitry of FIGURE 4, various hermetic refrigeration motor means having sizes or ratings exemplified by $7/32$ horsepower, $1/6$ horsepower and $1/8$ horsepower can be accommodated. Connection of the switch arm 48s to the end connection 48a of the iron-core inductor means 48 utilizes the full inductor winding for $1/8$ horsepower rating motor operation. Similarly, movement of the switch arm 48s to the central or intermediate tap connection 48b permits operation of a $1/6$ horsepower hermetic motor means whereas movement of the switch arm 48s into engagement with the tap connection 48c permits operation of a $7/32$ horsepower hermetic motor size though having the same basic solid state motor starting switch arrangement previously described. It is to be noted that for the circuitry of FIGURE 4 there can be certain motor ratings such as $1/8$ horsepower for example which would not require a starting capacitor such as indicated by reference numeral 50 and then the connection of the cadmium sulfide photoconductive cells 46 and 47 in parallel with each other can be made in series directly to the starting winding portion 44.

In addition to the advantages noted previously for circuitry of FIGURE 1 for example, it is to be understood that an additional advantage is obtainable in the circuitry of FIGURE 4 because the tapped inductor means 48 is used to provide a "universal" switching operation which can be utilized for starting of various motors of widely differing sizes. Still a further advantage occurs in the event of a catastrophic failure of starting switches for which a comparison can be readily made. In existing mechanical switches, one possible mode of failure is for the switch to stay on resulting in a burned out starting winding. In the case of a photoconductive switching operation, the only failure mode due to excessive overloads is to burn the cells or light controlled means clear thus resulting in protection of the starting winding of the motor means.

Figure 5:
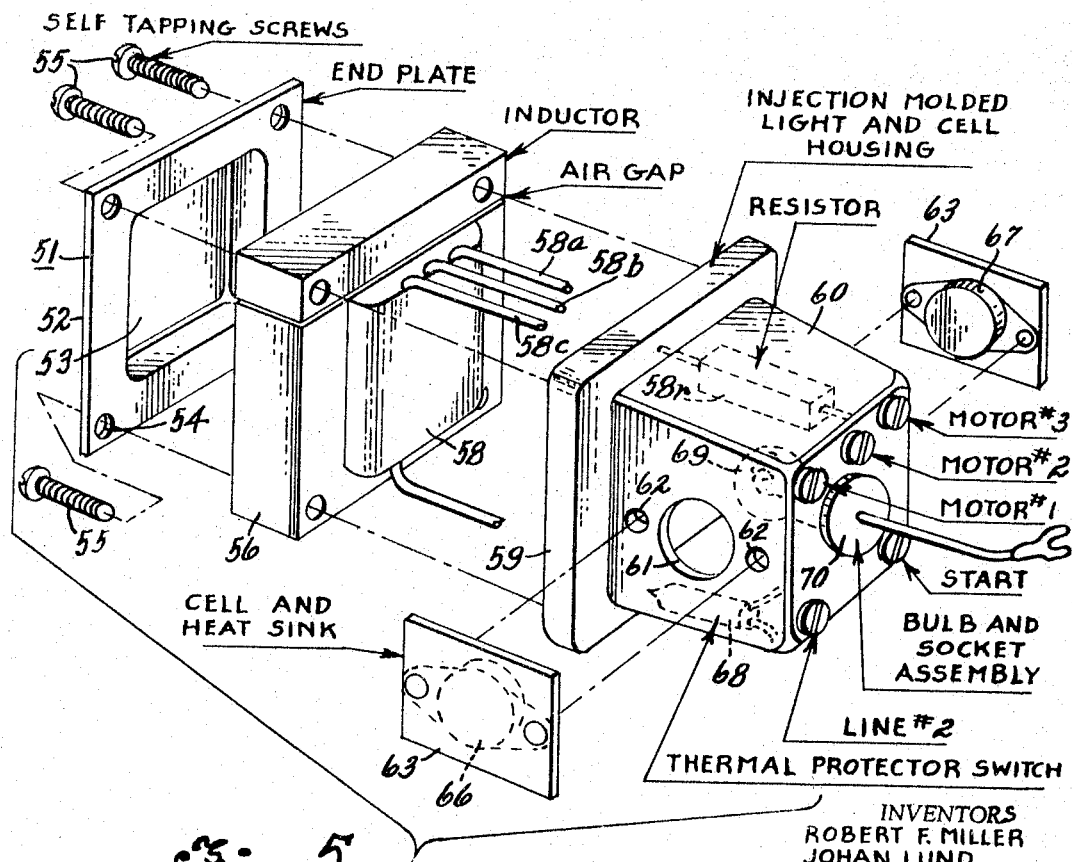
FIGURE 5 is an exploded perspective view of structural components for circuitry of FIGURE 4.

FIGURE 5 illustrates in a perspective exploded view a tapped inductor and switch means assembly which can provide the starting features for refrigeration motors to be operated in accordance with the present invention. The assembly is generally indicated by numeral 51 to include the following components. There is an end plate or base portion 52 having a central offset 53 as well as corner apertures 54 through which self-tapping screw means 55 can be inserted to complement a magnetic core or inductor means 56 carrying a coil 58 therewith. The coil 58 can have an end connection 58a as well as tap connection 58b and further tap connection 58c comparable to the inductor coil and connections identified for circuitry of FIGURE 4 by numerals having ten digits below those in FIGURE 5. The wound coil 58 is adapted to be mounted against an outwardly extending flange 59 of an end cover or housing portion 60 in which a resistance means 58r is carried. The leads including the tap connections to the coil can be joined to suitable screws or terminal points on this housing 60 for external connection in accordance with the circuitry of FIGURE 4 for example. The housing 60 includes aperturing 61 on each of opposite sides thereof together with screw mounting holes 62 to receive a heat sink portion 63 carrying the photo-conductive cells 66 and 67 comparable to the cells or light controlled devices 46 and 47 in the circuitry of FIGURE 4. A lamp bulb means 69 mounted in a socket assembly 70 on the housing 60 with a suitable energizing lead thereto can be provided in a location intermediate the light controlled means 66 and 67. The housing 60 can be made of a suitable plastic material molded to a predetermined configuration. The resistance means 58r can have a value of 20 ohms plus or minus 5% with five watt rating for example and the lamp bulb means 69 can be rated for 6.3 volts or other suitable voltage. A thermal protector switch or overload device 68 can also be mounted within the housing 60 if provided in circuitry previously described for FIGURE 2 and subsequently noted with description for FIGURES 6, 7 and 8 for example.

Figure 6:
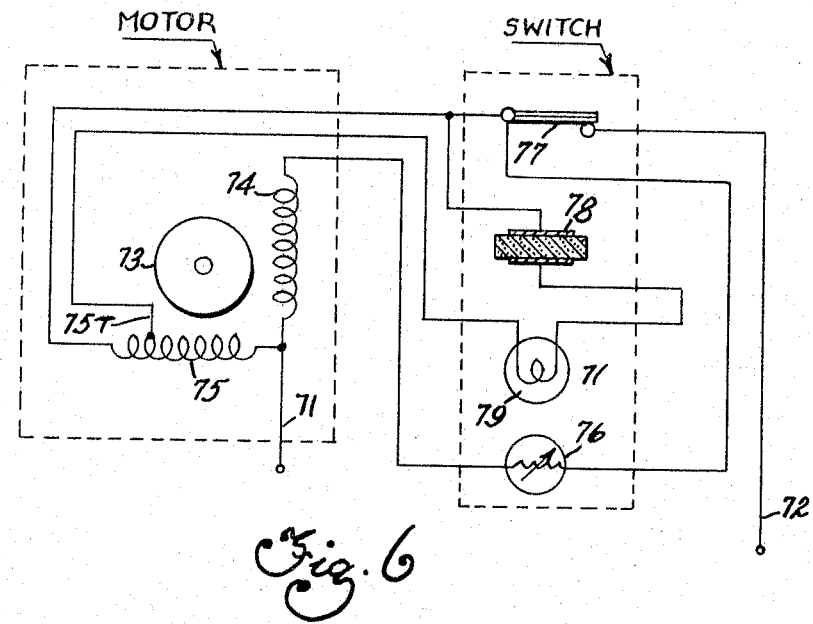
FIGURE 6 illustrates circuitry with tapped motor winding and starting components in accordance with the present invention.

Circuitry of FIGURE 6 provides a refinement of the features previously described though eliminating cost of certain components while retaining function thereof where possible. Thus in both FIGURES 6 and 7 the iron-core inductor means is eliminated. Also only one light controlled cell or device and heat sink assembly can be provided. Circuitry of FIGURE 6 requires a single cadmium sulfide photoconductive cell means of increased power handling capacity and the features of this circuit arrangement can be summarized to include the following. Power supply lines 71 and 72 can be connected to a suitable source. A motor means having a suitably journalled rotor portion 73 as well as a phase or start winding 74 and main or run winding 75 can be provided subject to a tap connection 75T on the main winding portion 75. A lamp bulb means is provided in a location adjacent to one side of a heavy duty photoconductive cell means 76. A thermal protection switch or overload means 77 can be provided in the supply line 72 as shown in FIGURE 6. A non-linear solid state device 78 can be used in place of resistance means previously noted. The lamp bulb means designated by reference numeral 79 can be in series with this non-linear solid state device to insure that the light bulb means 79 is off during running operation and strongly on during starting operation. The light controlled switching operation can be adapted to occur with sufficient powerance so that considerable variations in motor fabrication including airgap-windings and the like would have no effect on the switching operation.

Figure 7:
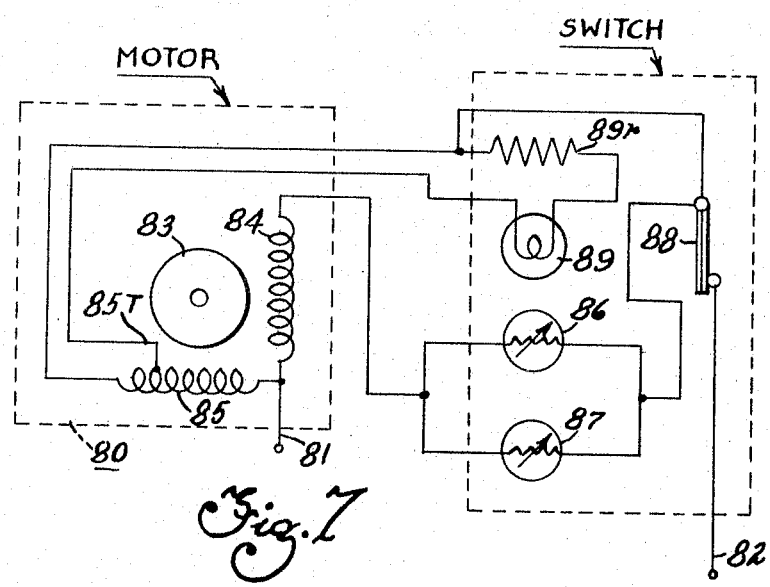
FIGURE 7 shows circuitry including overload protector and starting components with tapped motor winding means for operation also in accordance with the present invention.

Another motor means generally indicated by numeral 80 in FIGURE 7 can have supply lines 81 and 82 therewith for energization from a suitable source. The motor means can include a rotor portion 83 suitably journalled as well as a phase or starting winding portion 84 and a main or running winding portion 85 having a tap connection 85T thereto. A pair of cadmium sulfide photoconductive cells or light controlled semi-conductor means 86 and 87 can be provided in parallel with each other though series connected as to the start winding portion 84. A suitable thermal protective switching means 88 can be provided as shown in FIGURE 7 together with a lamp bulb means 89 and resistance means 89r. The circuitry of FIGURE 7 also eliminates the inductor means separately by providing an internal inductor in the run winding to take the place of the external inductor. It is to be understood that the main winding portion 85 is located in the magnetic stator core in such a way that a different magnetic path exists for the main winding portion and internal inductor. Thus the tap connection 85T as well as 75T is not per se a simple tap but rather provides a different magnetic path for the tapped portion. This is necessary because the tapped winding must undergo a larger voltage drop than the remainder of the running winding under conditions of current inrush. The tap voltage is to be roughly linear with current. One way of accomplishing this characteristic is to use ferrous wedges in the stator slots surrounding the tap coil portion. Such an approach is particularly useful if unused or dead slots already exist in the motor arrangement. It is to be understood that a predetermined tap connection can be provided for each of several differing motor sizes designated accordingly on the plastic housing associated therewith. By use of several tap positions with a particular coil arrangement it is possible for a single light controlled switch arrangement to handle various requirements.

Figure 8:
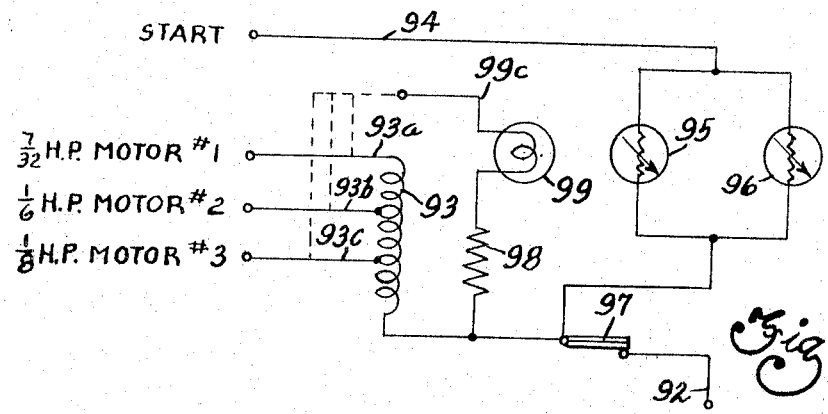
FIGURE 8 shows modifications of circuitry in FIGURES 6 and 7.

FIGURE 8 of the drawings illustrates circuitry for operation of the motor (not shown) to be energized from a pair of supply lines in a manner previously identified of which only one line 92 is shown in this view. An external tapped inductor means 93 is provided having connections 93a, 93b and 93c therewith adapted to fit various motor sizes as designated in FIGURE 8. A starting connection 94 can be provided with a pair of cadmium sulfide photoconductive cells or light controlled semi-conductor devices 95 and 96 in parallel with each other though included in series with this starting connection 94. A thermal protective relay means or overload protector device 97 can be provided as shown as well as a resistance means 98 and a lamp bulb means 99. The arrangement of FIGURE 8 permits a manufacturer or serviceman to connect the starting switch arrangement including the tapped inductor to a proper motor size connection and the bulb 99 has a lead or connection 99c therewith optionally joined to the appropriate tap corresponding to the motor size. Physical arrangement of the switching structure of FIGURE 8 would correspond substantially to that shown in FIGURE 5 of the drawings. The structure of FIGURE 5 provides for an external coil or inductance means to be suitably tapped for connection to motors of differing sizes.

Figure 9:
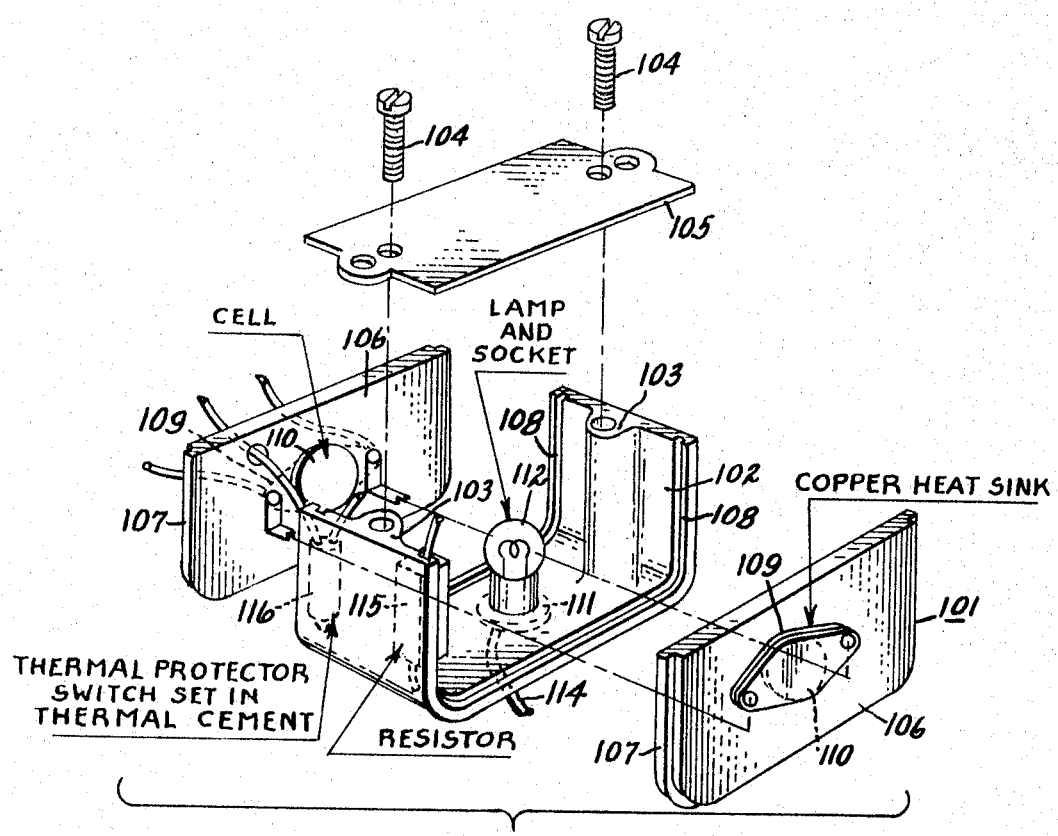
FIGURE 9 is an exploded perspective view of structural components for circuitry of FIGURES 6, 7 and 8.

It is to be understood that the circuit arrangement of FIGURES 6 and 7 would not require any external tapped inductance means and therefore a differing physical arrangement illustrated by FIGURE 9 of the drawings can be utilized for the switching components. The switching means generally indicated by numeral 101 in FIGURE 9 includes a substantially U-shaped body portion or support 102 having a pair of enlarged side segments 103 to which fastening devices such as screws 104 can be threaded to hold a cover or plate 105 thereto. Prior to installation of the cover or plate 105 a pair of opposite sidewalls 106 can be fitted with a dovetail fit along flanging 107 thereof complementary to substantially U-shaped grooving 108 in the support or body portion 102. Each of the sidewalls 106 can be provided with suitable aperturing for installation of a copper heat sink portion 109 as well as a pair of light controlled or photoconductive cell devices designated by reference numeral 110 in FIGURE 9 though corresponding to similar devices identified by differing reference numerals in other views of the drawings. These cells 110 can be suitably connected in parallel to each other. A socket means 111 having a lamp bulb means 112 suitably joined by a lead connection 114 thereto for energization of the lamp bulb can be provided as previously described. This lamp bulb and socket arrangement is located structurally in a location intermediate the parallel-connected cells 110. A resistance means 115 and an overhead or thermal protector switch set in thermal cement and indicated by numeral 116 can also be mounted internally on the support or body portion 102.

It is to be understood that the housing 60 in FIGURE 5 and body portion or support 102 in FIGURE 9 are made of a light-tight molded assembly of the bulb and cells therewith. Use of a non-linear device 78 for example in series with the lamp bulb 79 in circuitry of FIGURE 6 can include an epoxy or coated P-N-P germanium device alloyed with leads in one shot on a low resistivity base of poor lifetime. The result would be a back-to-back zener regulator with a brakeover of about two or three volts. The device would be fairly temperature insensitive because of the doping, at least more so than the cadmium sulfite cells. Use of such a non-linear device will permit a reduction in inductor size of about forty percent. The specific motor protection means per se ends upon the power rating of the motor and temperature control of a particular refrigeration installation.

FIGURE 10 of the drawings provides a graphical showing of component characteristics as an example of operation in accordance with the present invention. The systems and arrangements described in this disclosure concern the general concept of using a current controlled light source to trigger a solid state device to act as a switch for energizing and de-energizing the starting winding of an alternating current motor. A light bulb actuated by a non-liner inductor and a photoconductive cell as the light actuated starting winding switch can provide circuit reliability and proper heat dissipation. Since moving parts are avoided there is a minimum of wear resulting from on-off operation of the starting arrangement. It has been found that the lamp bulbs last well over one million cycles and more particularly in a range between 1.3 and 1.9 million cycles. Based upon a refrigerator starting every ten minutes for a twenty-four hour day this would extrapolate to a life of about twenty-two years. Use of the heat sink for adequate cooling assures reliability of the light control cells or devices for substantially the same time cycle. It is to be noted that if a non-linear device ($P^+$-N-$P^+$ germanium) is used in series with the lamp, the inductor can be replaced by a resistor or capacitor means. This further simplifies construction and is more economical. Also, the heavy duty cell means 76 in FIGURE 6 can be replaced by two four-layer two-terminal controlled rectifier structures connected in parallel with alternate polarity and triggered by light. Such an arrangement is slightly more expensive but will handle heavier currents. Also the heavy duty cell can be replaced by a five-layer, four junction single crystal silicon device which acts as a symmetrical A.C. switch and is triggered by light. Also the pair of photoconductive cells can be used to bias a pair of silicon controlled rectifiers which switch the winding connections. Furthermore, a photoconductive cell can be used to bias a four-terminal five-layer, four junction A.C. switch for switching the starting winding on and off. Thus, for switching, not only a light controlled silicon controlled rectifier means or specific four-layer device generally with three terminals can be used but also light controlled or light triggered four and five layer P-N junction devices can be used.

In summary, the present disclosure provides a method of switching a starting winding of a split phase motor by means of an optical switch with a light trigger actuated by the motor current demand. Also the circuitry illustrated for the present invention permits use of an inductance as a means of converting current demand to a light input. Also features of the present invention make it possible to use a non-linear inductor with an air gap to achieve full on-off operation of a lamp bulb. Operating characteristics as represented in FIGURE 10 graphically involve use of a light bulb non-linear inductor and resistance means in combination to achieve complete on-off light operation to control starting and running of a motor means. A non-linear resistor is disclosed in U.S. Patent 3,162,831—Heath issued Dec. 22, 1964. Also the switching operation can be accomplished by use of paralleled cadmium sulfide cells as light dependent resistors. The tapped inductor means can accommodate starting and running operation for differing sizes of motors. The structural arrangement of FIGURE 5 provides a practical mounting and assembly of the components together with a transformer or inductor means. The light sensing means can be dependent upon the main winding current. Also the inductor can be provided internally of the motor frame as a modified portion of the main winding of the motor means. A non-linear element such as the three layer $P^+$-N-$P^+$ low voltage germanium device can be used in series with the light source.

Features of the present invention further make it possible for a light actuated pair of silicon controlled rectifiers to be used as a switch in the starting winding of a motor means. The starting winding can be switched for energization using a light actuated P-N-P-N-P or N-P-N-P-N single crystal device. A single light or lamp bulb means is used to trigger a pair of photoconductive cells each controlling a silicon controlled rectifier means (one for each half of the A.C. cycle), to act as a starting winding switch. Also one light or lamp means can trigger a photoconductive cell which turns on a symmetrical five-layer controlled rectifier in the starting winding. Furthermore, a resistor can be used to replace the inductor in the light sensor or a capacitor can be used in place of the conductor in the light sensor where non-linear devices are provided in series with the lamp means.

While the embodiments of the present invention herein disclosed constitute preferred forms, it is to be understood that other forms might be adopted.

What is claimed is as follows:

1. An induction motor opto-electronic starting circuit comprising in combination with an induction motor having starting and running windings, an illuminating device characterized by the ability to become illuminated upon energization by an electrical current, means for energizing said illuminating device to a degree which is proportional to the magnitude of current flowing through said running winding, at least one light sensitive device characterized by the ability to become electrically conductive in the presence of light positioned to be illuminated by said illuminating device and means for connecting said light sensitive device in series with said starting winding for establishing an energizing circuit for said starting winding while said motor is in the start mode and for interrupting said energizing circuit while said motor is in the running mode.

2. An induction motor opto-electronic starting circuit comprising in combination with an induction motor having starting and running windings, a transformer having primary and secondary windings, an illuminating device characterized by the ability to become illuminated upon energization by an electrical current, means for connecting said primary winding of said transformer in series with said running winding, means for connecting said illuminating device across said secondary winding of said transformer, at least one light sensitive device characterized by the ability to become electrically conductive in the presence of light positioned to be illuminated by said illuminating device and means for connecting said light sensitive device in series with said starting winding for establishing an energizing circuit for said starting winding while said motor is in the start mode and for interrupting said energizing circuit while said motor is in the running mode.

3. An opto-electronic starting circuit as defined in claim 2 wherein said light sensitive device is selected from a group of devices of this type which includes light dependent resistors, cadmium sulfide cells and plural layer P-N junction semiconductor devices.

4. An opto-electronic starting circuit as defined in claim 2 wherein said illuminating device is an electric lamp.

5. An induction motor opto-electronic starting circuit comprising in combination with an induction motor having starting and running windings, a iron core inductor, an illuminating device characterized by the ability to become illuminated upon energization by an electrical current, means for connecting said iron core inductor in series with said running winding, means for connecting said illuminating device across said iron core inductor, at least one light sensitive device characterized by the ability to become electrically conductive in the presence of light positioned to be illuminated by said illuminating device and means for connecting said light sensitive device in series with said starting winding for establishing an energizing circuit for said starting winding while said motor is in the start mode and for interrupting said energizing circuit while said motor is in the running mode.

6. An opto-electronic starting circuit as defined in claim 5 wherein said light sensitive device is selected from a group of devices of this type which includes light dependent resistors, cadmium sulfide cells and plural layer P-N junction semiconductor devices.

7. An opto-electronic starting circuit as defined in claim 5 wherein said illuminating device is an electric lamp.

8. An opto-electronic starting circuit as defined in claim 5 wherein said iron core inductor has at least one tap for engagement by a switch contact arranged to connect selected portions thereof in series with said running winding.

9. An induction motor opto-electronic starting circuit comprising in combination with an induction motor having starting and running windings, a electrical tap on said running winding, an illuminating device characterized by the ability to become illuminated upon energization by an electrical current, means for connecting said illuminating device across said electrical tap and a selected one end of said running winding, at least one light sensitive device characterized by the ability to become electrically conductive in the presence of light located to be illuminated by said illuminating device and means for connecting said light sensitive device in series with said starting winding for establishing an energizing circuit for said starting winding while said motor is in the start mode and for interrupting said energizing circuit while said motor is in the running mode.

10. An opto-electronic starting circuit as defined in claim 9 wherein said light sensitive device is selected from a group of devices of this type which includes light dependent resistors, cadmium sulfide cells and plural layer P-N junction semiconductor devices.

11. An opto-electronic starting circuit as defined in claim 9 wherein said illuminating device is an electric lamp.

12. An induction motor opto-electronic starting circuit comprising in combination with an induction motor having starting and running windings, an electrical tap on said running winding, an illuminating device characterized by the ability to become illuminated upon energization by an electrical current, a resistor, means for connecting said illuminating device and said resistor in series across said electrical tap and a selected one end of said running winding, at least one light sensitive device characterized by the ability to become electrically conductive in the presence of light positioned to be illuminated by said illuminating device connecting said light sensitive device in series with said starting winding for establishing an energizing circuit for said starting winding while said motor is in the start mode and for interrupting said energizing circuit while said motor is in the running mode.

13. An opto-electronic starting circuit as defined in claim 12 wherein said light sensitive device is selected from a group of devices of this type which includes light dependent resistors, cadmium sulfide cells and plural layer P-N junction semiconductor devices.

14. An opto-electronic starting circuit as defined in claim 12 wherein said illuminating device is an electric lamp.

References Cited by the Examiner

UNITED STATES PATENTS

| | | | |
|---|---|---|---|
| 2,002,382 | 5/1935 | Wilson | 318—220 |
| 2,832,925 | 4/1958 | Koll et al. | 318—221 |
| 3,023,348 | 2/1962 | Cox | 318—480 X |
| 3,071,717 | 1/1963 | Gordon | 318—221 |
| 3,071,719 | 1/1963 | Latter | 318—221 |
| 3,116,445 | 12/1963 | Wright | 318—220 |
| 3,226,620 | 12/1965 | Elliott et al. | 318—221 |

ORIS L. RADER, *Primary Examiner.*

G. Z. RUBINSON, *Assistant Examiner.*